(No Model.) 2 Sheets—Sheet 2.
J. V. REAMS.
GUARD FOR RAILROADS.
No. 389,245. Patented Sept. 11, 1888.
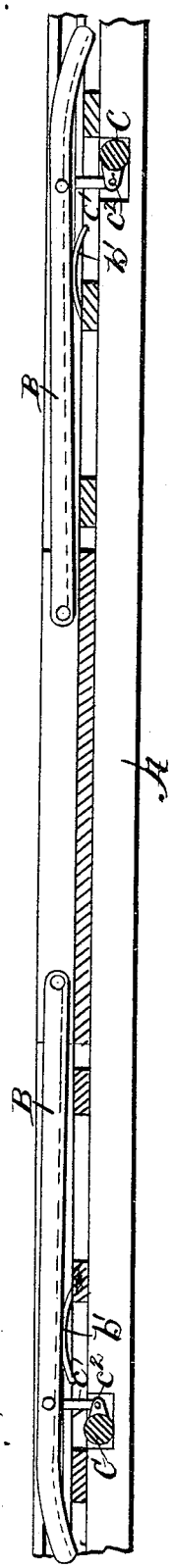
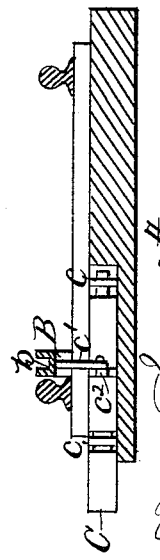

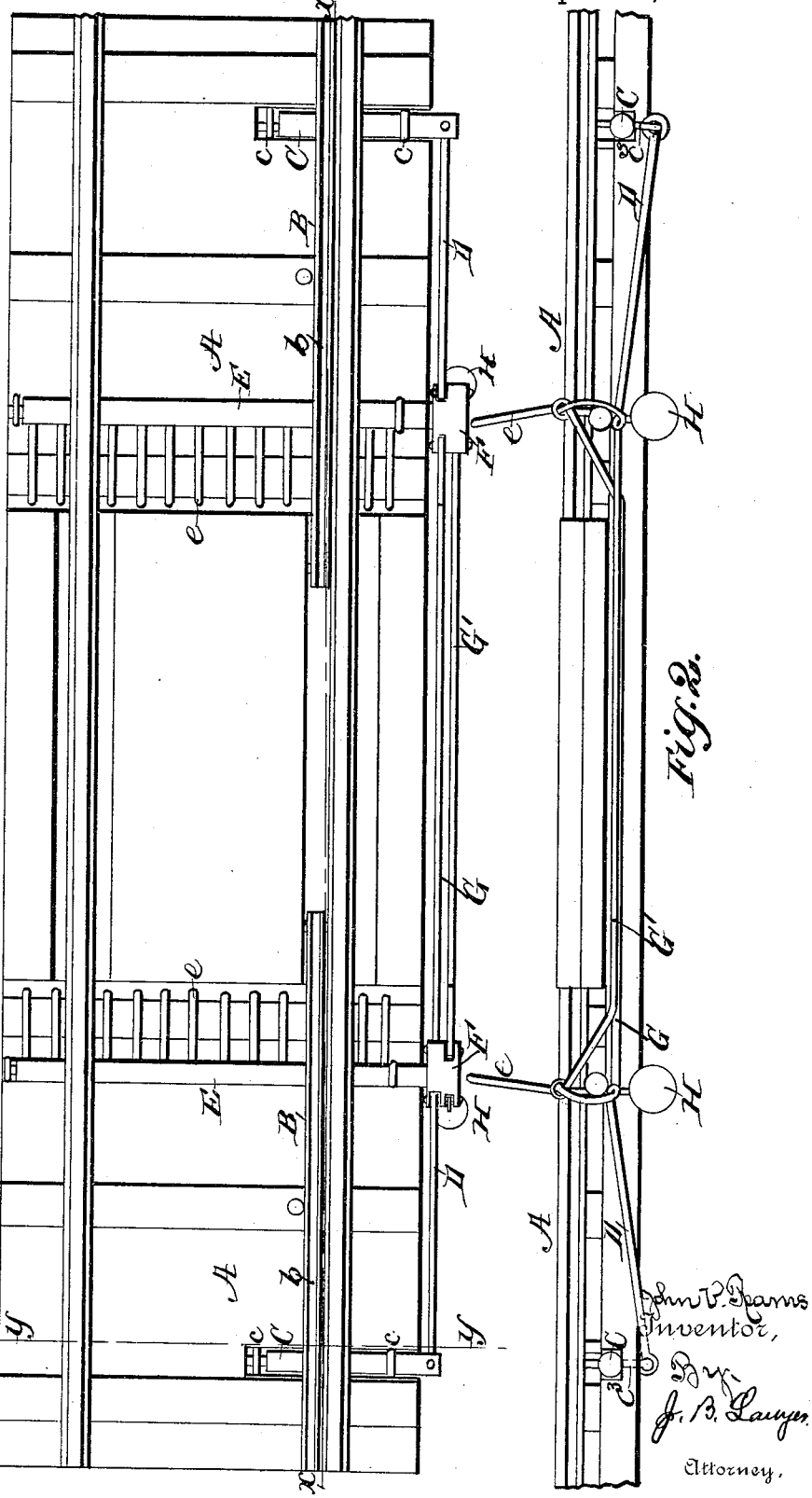

United States Patent Office.

JOHN V. REAMS, OF MIDLAND, MICHIGAN, ASSIGNOR OF TWO-THIRDS TO FREDERICK L. BEACHAM AND ROGER W. CLASON, OF SAME PLACE.

GUARD FOR RAILROADS.

SPECIFICATION forming part of Letters Patent No. 389,245, dated September 11, 1888.

Application filed May 14, 1888. Serial No. 273,794. (No model.)

*To all whom it may concern:*

Be it known that I, JOHN V. REAMS, a citizen of the United States, residing at Midland, in the county of Midland and State of Michigan, have invented certain new and useful Improvements in Automatic Guards for Railroads; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has for its object to provide a new and useful construction in cattle-guards for railroads; and it consists in providing two auxiliary rails, one on each side of the crossing, said rails being pivoted at one end and carrying links upon their opposite ends, said links connecting short shafts provided with stems upon their outer ends, and shafts provided with teeth or pickets carrying plates upon their ends, and rods for connecting the said plates with stems upon the ends of the short shafts, as will be hereinafter more fully described.

In the accompanying drawings, in which corresponding parts are designated by similar letters, Figure 1 is a top plan view of my invention with the teeth or pickets thrown down. Fig. 2 is a side elevation with the teeth or pickets in an upright position. Fig. 3 is a sectional view on the line $x\ x$, Fig. 1. Fig. 4 is a horizontal section on the line $y\ y$, Fig. 1. Fig. 5 is a detached view of the shaft for holding the pickets or teeth, and Figs. 6 and 7 are detail views.

Referring to the drawings, A represents railroad-ties having the ordinary rails laid thereon. Two auxiliary rails, B, are laid parallel with the ordinary rails, one on each side of the crossing, and are provided with grooves or channels $b$, for receiving the inner flange of the car-wheels, the object of which will be hereinafter more fully described.

Near the edge of the crossing the rails B are loosely pivoted or hinged in order that they may be moved to and from the ties at their opposite ends by means of a spring, $b'$. A short shaft, C, secured in bearings $c$, is connected to the auxiliary rails B by means of a link, $c'$, which is hinged or pivoted to a stud, $c^2$, which, when weight is applied to the auxiliary rails, causes the said shaft to turn or rotate partially. To the opposite end of this shaft is secured a stem, $c^3$, provided with a hook or other means for attaching the connecting-rods D, that operate the teeth or pickets.

At a suitable distance from the track-crossing a shaft, E, is laid under the track-rails and extends the entire width of the track, said shaft being provided with teeth or pickets $e$, which, when in an upright position, prevent cattle or other animals from wandering on the tracks. This shaft is secured in bearings, and upon one end thereof is secured a plate, F, extending a short distance on each side of the said shaft and provided with bearings which receive the opposite ends of the connecting-rods. From the stem $c^3$ on the shaft C a rod, D, leads to the lower end of the plate F, and thereby forms a connection between the two shafts, which work simultaneously with each other.

It will be seen that the lower end of the plate is provided with two bearings, in order that a further connecting-rod, G, may be fastened therein leading to the like mechanism on the opposite side of the crossing.

To form a proper connection between the two, and in order that the mechanism on each side of the crossing may work in a like manner, a rod, G', is also connected, which is alike in construction to the rod G, but their connection to the plate F is reverse to one another. Weights H are secured to the lower end of the plates F in addition, in order to insure a prompt rising of the teeth or pickets.

From the above description it will be seen that until the train comes in contact with the auxiliary rails the teeth or pickets remain in an upright position. It will then be seen that as the train approaches the crossing the inner rims of the wheels enter the grooves in the auxiliary rails and press them down, and by means of the connecting-links cause the shaft C to rotate, and motion imparted to the rod D causes the teeth or pickets secured to the shaft E to fall below the surface of the rails and allow the train free passage over them. When, however, the weight of the train is off the auxiliary rails, the teeth or pickets will rise into an upright position by means of the springs and weights.

It will also be seen that the mechanism on both sides of the crossing is substantially the same in construction, and by means of the connecting-rods G G' is made to operate simultaneously, no matter which way the train may be running.

This invention, it will be seen, does away with the culverts generally used and accomplishes the object without the necessary repairs required by them. It prevents cattle from straying on the track and averts both damage to the train and injury or loss of stock.

It has been found from experience that if cattle are upon the track when a train approaches they will follow the track in preference to crossing. It will therefore be seen that the object I have in view is to make sure that in case cattle should be crossing as the train approaches they will continue their course, as the gates being in an upright position would not prevent them from following the rails.

Having described my invention, what I claim, and desire to secure by Letters Patent, is—

In an automatic guard for railroads, the combination of the auxiliary rails B, pivoted at one end, and springs $b'$, located beneath their opposite ends, the shafts C, connected to the said auxiliary rails by means of the links $c'$, one end of the said shafts C provided with downwardly-projecting stems $c^3$, the shafts E, provided with teeth or pickets, the plates F, secured upon one end of the shaft E, the rods D, leading from the said stems $c^3$ to the plates F, and the connecting-rods G G', connecting the said plates F above and below the shafts E, and the weights H, attached to the plates F, substantially as herein shown and described.

In testimony whereof I affix my signature in presence of two witnesses.

JOHN V. REAMS.

Witnesses:
   WM. DAVIDSON,
   STOD E DEAN.